United States Patent [19]
Pan

[11] Patent Number: 4,922,265
[45] Date of Patent: May 1, 1990

[54] INK JET PRINTHEAD WITH SELF-ALIGNED ORIFICE PLATE AND METHOD OF MANUFACTURE

[75] Inventor: Alfred I. T. Pan, Mountain View, Calif.

[73] Assignee: Hewlett-Packard Company, Palo Alto, Calif.

[21] Appl. No.: 357,915

[22] Filed: May 30, 1989

Related U.S. Application Data

[60] Division of Ser. No. 125,433, Nov. 25, 1987, Pat. No. 4,894,664, which is a continuation-in-part of Ser. No. 856,740, Apr. 28, 1986, abandoned.

[51] Int. Cl.[5] .......... G01D 15/16; B41J 3/04

[52] U.S. Cl. .......... 346/1.1; 346/102 R; 29/890.1; 204/11

[58] Field of Search .......... 346/140, 1.1; 29/157 C; 204/11, 9

[56] References Cited

U.S. PATENT DOCUMENTS 4,490,728 12/1984 Vaught .......... 346/140 X
4,528,574 4/1985 Boyden .......... 346/140
4,535,343 8/1985 Wright .......... 346/140
4,701,766 10/1987 Sugitani .......... 346/1.1
4,746,935 5/1988 Allen .......... 346/140

FOREIGN PATENT DOCUMENTS 217368 12/1983 Japan .

*Primary Examiner*—Joseph W. Hartary
*Attorney, Agent, or Firm*—Hewlett-Packard Company

[57] ABSTRACT

An ink jet printhead and process for manufacturing same wherein an opening in an orifice plate of the printhead is precisely aligned with a transducer element on a thin film substrate member of the printhead. A barrier layer having an opening therein is aligned with the transducer element and is located on the thin film substrate member adjacent to a metal seed layer. A metal orifice layer is plated on the metal seed layer and over the barrier layer and extends into the opening therein to form a convergent orifice opening. This opening is aligned to both the opening in the barrier layer and the transducer element on the thin film substrate member. Since the transducer element and metal orifice plate layer are both precisely aligned to the opening in the barrier layer, the transducer element and the metal orifice layer are said to be "self-aligning".

3 Claims, 4 Drawing Sheets

PRIOR-ART

PRIOR-ART

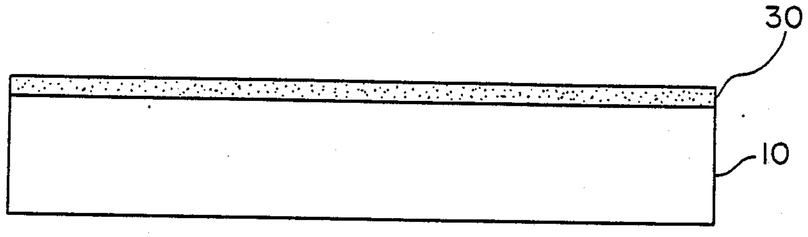
FIG. 5A
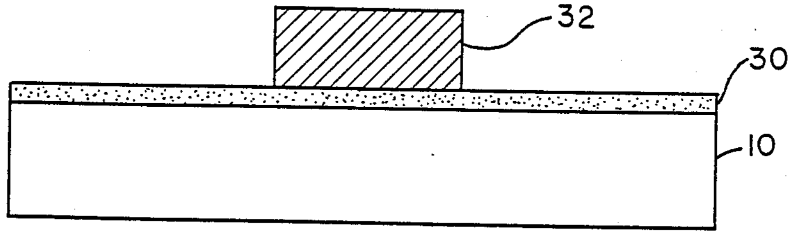
FIG. 5B
FIG. 5C
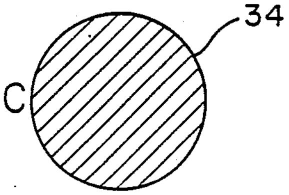
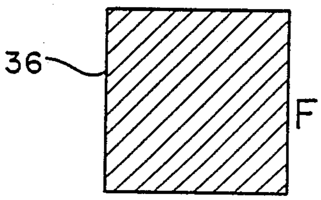
FIG. 5B
FIG. 5D
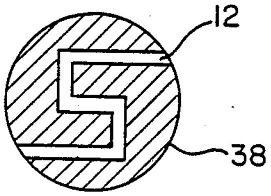
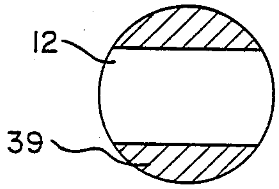
FIG. 5F

INK JET PRINTHEAD WITH SELF-ALIGNED ORIFICE PLATE AND METHOD OF MANUFACTURE

BACKGROUND OF THE INVENTION

This is a division of application Ser. No. 07/125,433, filed 11/25/87 U.S. Pat. No. 4,894,664.

This application is a continuation-in-part of my earlier parent application Ser. No. 856,740, filed Apr. 28, 1986.

A prior-art thermal ink jet printhead 2 is shown in FIG. 1. The advancement of thermal ink jet (TIJ) technology stumbles upon an assembly problem: detachment of the nozzle plate 1. Presently, each nozzle plate 1 is individually attached to the resistor structure 3 as shown in FIG. 2A. This costly procedure is problem-prone. For example, this procedure often misaligns the nozzle plate 1. FIG. 2A, a simplified representation of the prior art, omits many of the details. The differences in thermal expansion coefficients among different components of the TIJ printhead 2 tend to debond the nozzle plate 1 during the curing process of the glue. This adhesion problem limits the number of nozzles in the TIJ printhead 2.

The ink refilling rate of prior-art TIJ printhead 2 presents another problem. It limits the printing speed. In prior-art TIJ printheads 2 shown in FIG. 2B, ink reaches the nozzle 6 after traveling through high friction channels 7 which restrict the ink flow.

The invention described in U.S. Pat. No. 4,438,191, *Monolithic Ink Jet Print Head,* incorporated herein by reference, proposes a monolithic ink jet printhead that would solve some of the problems listed above. However, the fabrication of this device presents additional problems: formation of ink holes, removal of dry film residue from the firing chambers and other locations, proper alignment of the nozzle, and various manufacturing problems. Also, the nozzles of the monolithic printhead do not diverge.

SUMMARY OF THE INVENTION

The present invention, a monolithic thermal ink jet printhead with integrated nozzle and ink well and a process for making it, solves the nozzle attachment and ink flow problems of prior-art printheads mentioned above. Also, the present invention reduces manufacturing costs and improves reliability. The reduced manufacturing costs are partially achieved through an automated manufacturing procedure. The increased reliability is partially achieved through longer resistor life and smoother ink flow in the printhead. Without these improvements, page-width TIJ print arrays would not be possible.

Further advantages of the present invention include the automatically-aligned nozzle 19, shown in FIG. 3. Prior-art processes misalign the nozzle plate 1 shown in FIG. 1. This misalignment causes dot spread and slanted printing. The new monolithic TIJ printhead 20 reduces resistor failure. In prior-art TIJ printheads shown in FIG. 1, the collapsing bubble and refilling ink impact the resistor surface. The cavitation force eventually destroys the resistor. In the new monolithic TIJ printhead 20 shown in FIG. 3, the collapsing bubble collides with the refilling ink. The ink absorbs most of the cavitation forces. The cantilever beams 12, upon which the heating element, such as a resistor, is built, absorb the remaining cavitation force. The cantilever beams, constructed from ductile nickel, float in a reservoir of ink. The mechanical forces on resistors will be buffered by the flexibility of the cantilever beams as well as the ink itself.

Also, in the present invention printing speed is not limited by the ink refilling rate. The ink well 11 is directly connected to the heating elements 15 as shown in FIG. 3. This direct connection reduces resistance to ink flow. Thus, printing speed is not limited by the ink refilling rate.

Accordingly, a novel feature of the present invention is the provision of a thermal ink jet printhead of the type described wherein an orifice plate is electroplated up and over a barrier layer having an opening therein which was previously aligned with a thermal ink jet heater resistor. Since both the orifice plate and the thermal ink jet heater resistor are both aligned to an opening in the barrier layer, they are aligned to each other or are "self-aligning". A convergent nozzle opening in the orifice plate is precisely aligned with a center line through the heater resistor transducer element. In a preferred embodiment of the invention, the plating of the metal orifice layer includes plating a first orifice plate section over a portion of the barrier layer and then plating a second orifice section as an extension of the first orifice section to form the above described convergent nozzle opening aligned with the heater resistor transducer element.

BRIEF DESCRIPTION OF THE DRAWINGS

FIG. 1 shows a prior-art thermal ink jet printhead.

FIG. 3 shows a cross-section of the preferred embodiment of the invention with cantilever beams.

FIGS. 5A–5C show steps in preparing the substrate for masking.

FIGS. 6A–6C show the formation of the cantilever beams and the well.

FIG. 7A shows the formation of the resistor layer and a protective layer.

FIG. 7B shows the formation of the conducting layer for the nozzle and the donut-shaped frame for the nozzle.

FIGS. 8A, 8B, and 8C show the steps taken to construct the nozzle shown in FIG. 3.

FIG. 10 shows a top view of the alternate embodiment shown in FIG. 9.

FIG. 11 is a cut-away isometric view of a thermal ink jet printhead showing only a single cantilevered heater resistor for sake of brevity and cut-away at the center line of the heater resistor. FIG. 11 is taken along lines 11—11 of FIG. 12.

FIG. 12 is a plan view taken along lines 12—12 of FIG. 11.

DETAILED DESCRIPTION OF THE INVENTION

FIG. 3 shows a cross-section of the preferred embodiment of the invention, a monolithic thermal ink jet printhead with integrated nozzle 19 and ink well 11.

Figure 2A:
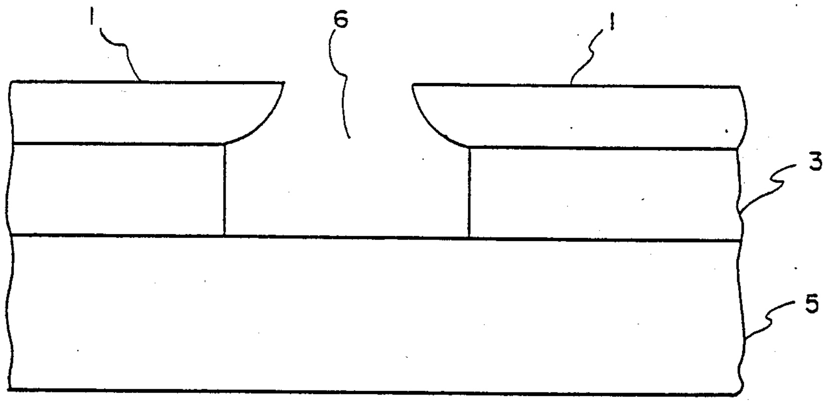
FIG. 2A shows a cross section of a prior-art nozzle.
Figure 2B:
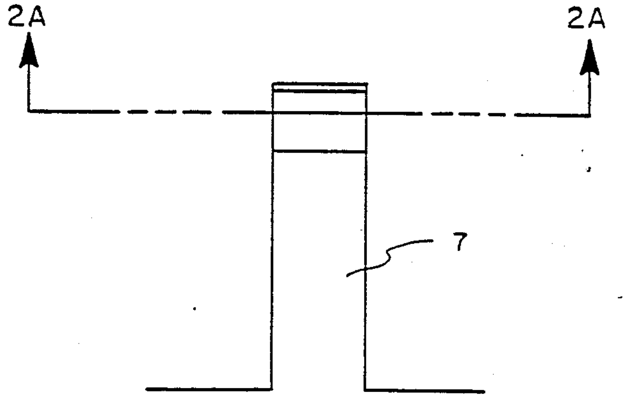
FIG. 2B shows a top view of a prior-art nozzle, the cut A—A corresponds to the cross section of FIG. 2A.
Figure 4:
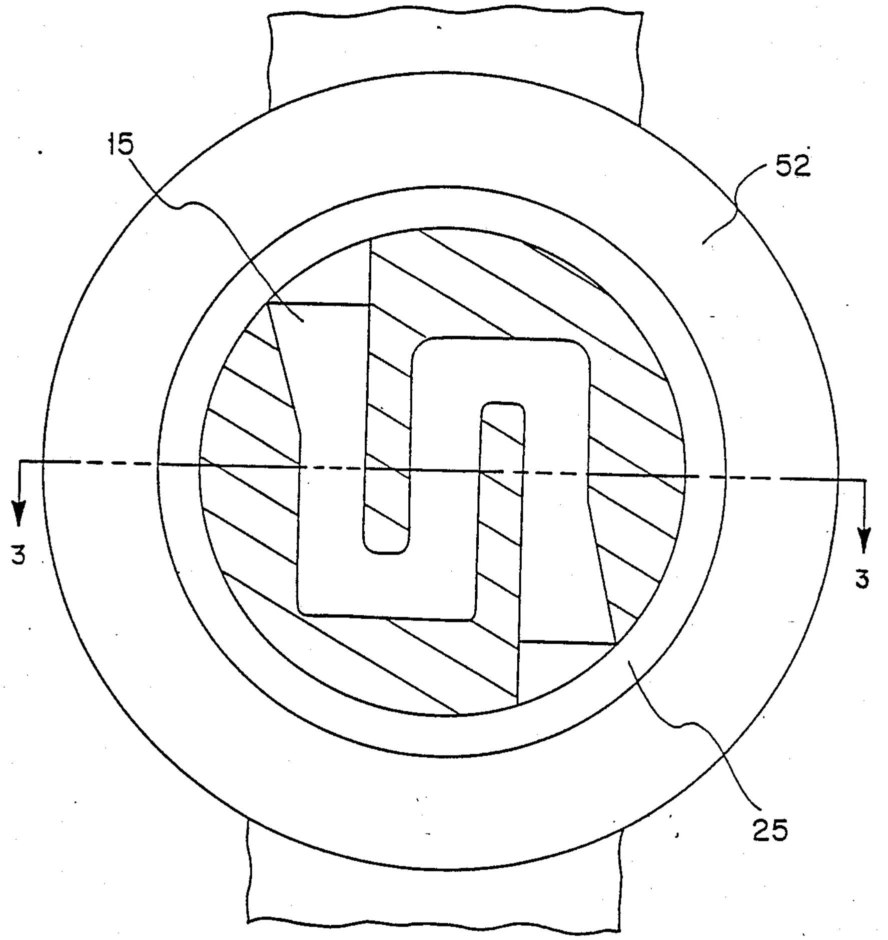
FIG. 4 shows a top view of the preferred embodiment of the invention with the nozzle removed; the cut A—A corresponds to the cross-section of FIG. 3.

FIG. 4 shows a top view of the monolithic printhead 20. Inside the substrate 10 a well 11 resides to hold ink. The heating element, a resistor layer 15, evaporates the ink. The ink (water vapor, glycol, and ink pigment particles) migrates to the nozzle area 17. The compound bore nozzle 19 directs the gaseous ink as it is expelled from the nozzle area 17 by pressure from the accumulated ink.

A thermal barrier layer 21 prevents heat from flowing to the nickel cantilever beams 12 and nickel substrate 40. With this arrangement, heat from the resistive layer 15 heats the ink and is not wasted on the printhead 20. A patterned conducting layer 23 shorts out the resistive layer 15 except on the cantilever beams 12. A protective layer 25 prevents electrical shorts during the nickel plating process to form the nozzle 19. The protective layer 25 also protects layers from chemical and mechanical wear. A conducting layer 27 is deposited during the manufacturing process to provide a surface upon which the nozzle 19 can be constructed.

The process to manufacture monolithic thermal ink jet printheads 20 involves several steps. On a substrate 10 of glass or silicon shown in FIG. 5A, a conducting layer 30 approximately 1000 Å is deposited using a sputter deposition technique. By conducting electricity through the conducting layer 30, a surface is formed to which nickel plating can be attached. Next, a dry film mask 32 is laminated on the conducting layer 30 as shown in FIG. 5B. This mask 32, having a diameter of 2 to 3 mils, defines the location of the cantilever beams 12 in FIG. 3 as well as 13 in FIG. 9. FIG. 5C shows the various shapes a mask 32 can have. Mask 38 corresponds to the printhead 20 shown in FIGS. 3 and 4. Mask 34 corresponds to printhead 60 shown in FIGS. 9 and 10. The mask 39 corresponds to printhead shown in FIGS. 11 and 12.

Next, an electroplating process deposits a nickel layer 40 from 1 to 1.5 mils thick onto the exposed substrate 10. Thus, cantilever beams 12 are formed. After completion of the plating, removal of the dry film mask 38 exposes the cantilever beams 12 shown in FIG. 6B. The well 11 is formed through a multi-step process. First, a sputtering process deposits a protective metal layer 42. This layer is made of gold and has a thickness of 1000 Å. Next, a mask 44 defines the well 11. Then, a wet chemical etching process, such as KOH for silicon or HF for glass, forms the well 11. When the protective layer 42 and the mask layer 44 are removed, the device appears as shown in FIG. 6C. The conductive layer at the bottom of the well 11 is then removed using a selected metal etchant.

Next, a thermal insulating layer 21, made of LPCVD $SiO_2$ or another dielectric, is deposited. It is deposited to a thickness of 1.5 microns on the inside of the well 11, on top of the plated nickel layer 40, and around the cantilever beams 12 as shown in FIGS. 3 and 7A. The thermal insulation layer 21 encourages the efficient operation of the resistor layer 15. On top of the thermal insulating layer 21, a resistive layer 15 made of material such as tantalum-aluminum is deposited to a thickness of 1000 Å to 5000 Å as shown in FIGS. 3 and 7A. Next, a conducting layer 23 made of gold or aluminum to a thickness of 5000 Å is selectively patterned on resistive layer 15 to short out portions of the resistive layer 15. The conducting layer 23 is not present on the cantilever beam 12 so that the resistive layer 15 is operative there. On top of the conducting layer 23, a protective layer 25 made of silicon carbide, SiC, silicon nitride, $Si_3N_4$, or other dielectric material is deposited using a low pressure chemical vapor deposition (LPCVD) process. This layer protects the device from chemical and mechanical wear.

A conducting layer 27, 1000 to 5000 Å thick, is deposited on the protective layer 25. It is formed by sputtering. The conducting layer 27 provides a surface upon which the nozzle 19 can be formed with an electroplating process. Next, portions of the conducting layer 27 are etched away through a wet-etching process as shown in FIG. 7B, so that the only conducting layer 27 remaining is located where the nozzle will be constructed.

Next, donut-shaped dry film blocks 52 are laminated onto the conducting layer 27. These blocks 52 form a frame for the construction of the nozzle 19. In the preferred embodiment of the invention, the nozzle 19 is constructed in a two-step plating process. The results of the first step are shown in FIG. 8A. The base of nozzle 19 is formed by electroplating nickel onto the conducting layer 27 to a thickness of 1.5 mil to 2.0 mil, which equals the height of the nozzle 19. Next, a glass slab or any other flat dielectric material 56 is pressed on the nozzle 19 as shown in FIG. 8B. This slab 56 acts as a nozzle 19 mold for the second part of the nickel plating process. FIG. 8C, the electroplating process is continued to form the nozzle 19. Now that the nozzle 19 is completed, the slab 56 is removed. The resulting product is the printhead 20 shown in FIG. 3. Other methods can be used to form the nozzle 19. For example, the nozzle 19 could be constructed through a one-step plating process without the use of the slab 56.

Figure 9:
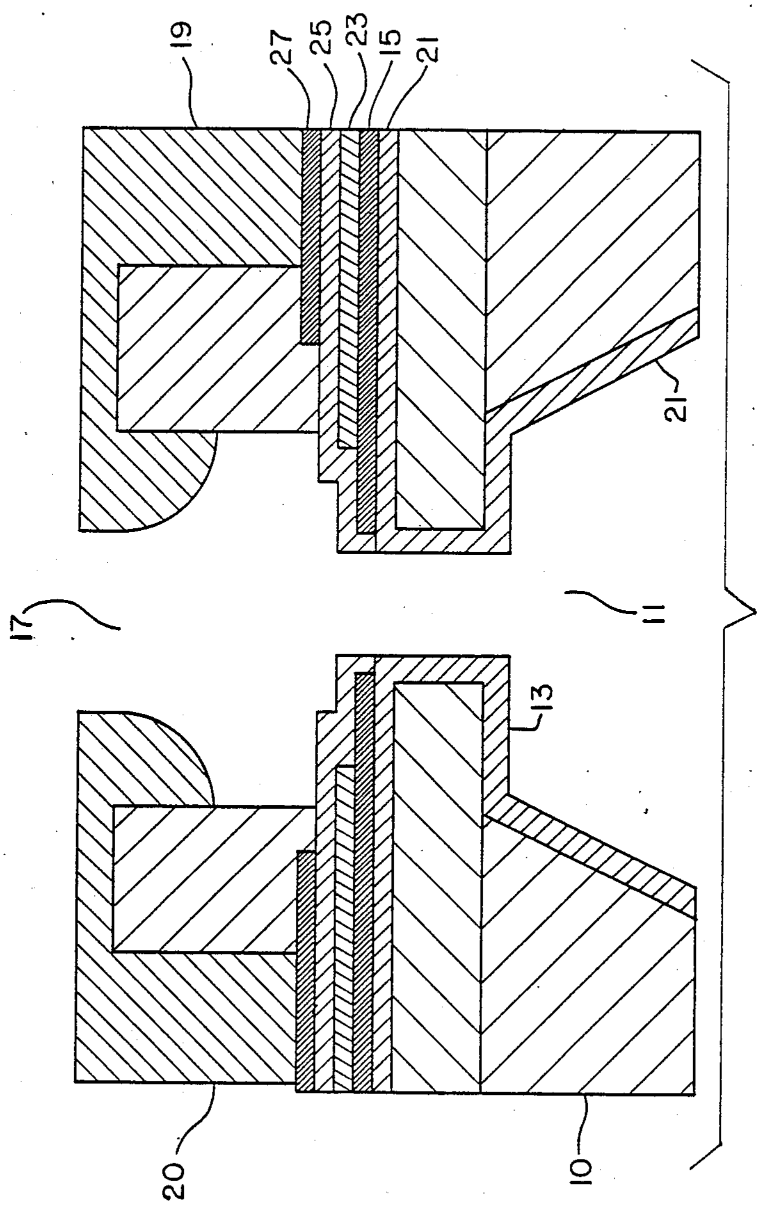
FIG. 9 shows an alternate embodiment of the invention without cantilever beams.

FIG. 9 shows an alternate embodiment of the printhead 20. A nozzle 19 having this shape is called a compound-bore nozzle 19. It controls the stream of ink ejected from the nozzle 19. The ink stream ejected from a compound-bore nozzle has a narrow diameter and minimum spread. The cantilever beams 13 protrude inward and the heating element 15 rests on top of the cantilever beam 13. This embodiment of the printhead 20 would be formed in the same way as the printhead 20 shown in FIG. 3. The primary difference in the process would be in the type of mask 32 used when layer 40 is placed onto substrate 10. Instead of mask 38 for the cantilever beams 12, a mask similar to mask 34 is used.

Description of FIGS. 11 and 12

Referring now to FIG. 11, this view is cut-away at the center line of the cantilevered heater resistor 60 which is disposed on top of an insulator material 62. The insulator material 62 is shown as only a single layer in FIG. 11 for sake of brevity, but it will be understood that this insulating material 62 may be formed of multiple insulating and protective layers inthe same manner as described above with reference to earlier figures. The insulating material 62 is formed around the cantilever beam 64 which extends from one side to the other of the ink reservoir walls 66. These walls 66 partially define the ink flow paths on each side of the cantilever beam 64 and these paths receive ink from the lower ink reservoir beneath the heater resistor 60 and defined by the slanted walls of insulating material 68 which cover the previously etched substrate 70. This etching step has been previously described with respect to the fabrication of the structures in FIGS. 3 and 9.

The substrate 70 of either glass or silicon, for example, is initially covered with a flexible support layer 72 of nickel plating which of course is the same material that forms the cantilever beam 64. The heater resistor 60 on the top of the beam 64 is electrically interconnected to a conductive trace or strip 74 which is shown only at one side of the resistor 60, but will also exist at the other side of the resistor 60 and not shown in FIG. 11.

A seed layer is patterned as indicated at 76 to form the necessary nickel seed growth material for the orifice plate to be formed, and a dry polymer film is patterned in a manner previously described to leave an annular ring 78 encircling the cantilevered resistor 60 and its associated ink flow port surrounding the resistor. This annular ring 78 serves to define the upper ink reservoir area over the heater resistor 60. This annular ring 78 may, for example, be fabricated of a polymer material such as RISTON or VACREL available from the Du-Pont Company, and is used to define the convergent orifice geometry for the upper nickel nozzle plate 80. The nozzle plate 80 may be formed in a two step process as described above to provide the converging orifice surfaces 82 which terminate at the output orifice opening 84 on the outer surface of the orifice plate 80. The preference for this convergent orifice geometry is described in more detail in U.S. Pat. No. 4,694,308 issued to C. S. Chan et al, assigned to the present assignee and incorporated herein by reference.

Thus, from the cut-away isometric view in FIG. 11 and its associated plan view of FIG. 12, it is clearly seen that not only does this printhead structure provide for an improved ink flow rate to the resistive heater 60, but it simultaneously provides for the cooling of the heater resistor 60 and it simultaneously minimizes the cavitation wear received by the heater resistor 60. This is partially the result of the flexible nature of the cantilever beam 64 which allows the surrounding ink to receive and absorb cavitational forces resulting from ink ejection. During the flexing of this cantilever beam 64 during an ink jet printing operation, cavitational forces transmitted to the heater resistor 60 from the output orifice 82, 84 are retransmitted to the surrounding ink where the resistor 60 is simultaneously cooled. And, the cooling of the heater resistor 60 is a very significant feature of present inventio and its ability to maximize resistor and orifice packing density within the ink jet printhead.

Finally, using the polymer masking and nickel electroforming techniques previously described to define the geometry of the orifice plate 80, the center line of the orifice opening 84 may be either precisely aligned with respect to the resistor 60, or in some structures it may be desired to provide a predetermined offset between the center line of the orifice 84 and the mid point of the heater resistor 60.

In the preferred embodiment of the invention, the printhead ejects ink which contains water, glycol, and pigment particles. However, it can be used to eject other substances.

I claim:

1. A process for accurately aligning an orifice opening in an orifice plate of an ink jet printhead with a transducer element on a thin film substrate member of said printhead, which includes the steps of:

a. providing a transducer element within a thin film substrate,
b. providing a metal seed layer having an opening therein on said thin film substrate,
c. providing a barrier layer on said thin film substrate and adjacent said opening in said seed layer,
d. providing an opening in said barrier layer and aligning said opening in said barrier layer with said transducer element in said thin film substrate, and
e. plating a metal orifice layer on said metal seed layer and over said barrier layer to form an orifice opening extending within said opening in said barrier layer and aligned thereto, whereby said orifice opening is aligned to both said opening in said barrier layer and to said transducer element in said thin film substrate.

2. The process defined in claim 1 wherein the plating of said metal orifice layer includes plating a first orifice plate section over a portion of said barrier layer and then plating a second orifice plate section as an extension of said first orifice plate section to form a convergent nozzle opening within said opening in said barrier layer and aligned with said transducer element.

3. An ink jet printhead characterized by the precise alignment of an orifice plate disposed on top of a thin film substrate and comprising:

a. a transducer element located within said substrate and having electrical conductors connected thereto for providing energizing pulses to said transducer element during an ink jet printing operation,
b. a seed layer having an opening therein disposed on said substrate,
c. a barrier layer disposed on said thin film substrate and located adjacent to said opening in said seed layer, said barrier layer having an opening therein aligned with said transducer element, and
d. a metal orifice layer plated up from said seed layer and over said barrier layer and having an orifice opening therein located within and aligned to said opening in said barrier layer, whereby said opening in said orifice plate is also aligned to said transducer element in said thin film substrate.

* * * * *